United States Patent
Slama (10) Patent No.: US 11,491,923 B2
(45) Date of Patent: Nov. 8, 2022

(54) IMAGE PRESENTATION FOR VEHICLES WITH MULTIPLE CAMERAS

(71) Applicant: MOTHERSON INNOVATIONS COMPANY LTD., London (GB)

(72) Inventor: Alexander Slama, Stuttgart (DE)

(73) Assignee: Motherson Innovations Company Limited, London (GB)

( * ) Notice: Subject to any disclaimer, the term of this patent is extended or adjusted under 35 U.S.C. 154(b) by 0 days.

(21) Appl. No.: 16/808,659

(22) Filed: Mar. 4, 2020

(65) Prior Publication Data

US 2020/0282924 A1 Sep. 10, 2020

(30) Foreign Application Priority Data

Mar. 6, 2019 (DE) .................... 10 2019 105 659.4

(51) Int. Cl.
*B60R 11/04* (2006.01)
*B60K 35/00* (2006.01)

(52) U.S. Cl.
CPC .............. *B60R 11/04* (2013.01); *B60K 35/00* (2013.01); *B60K 2370/149* (2019.05); *B60K 2370/1868* (2019.05); *B60R 2300/101* (2013.01); *B60R 2300/105* (2013.01); *B60R 2300/305* (2013.01); *B60R 2300/605* (2013.01); *B60R 2300/607* (2013.01); *B60R 2300/70* (2013.01); *B60R 2300/8086* (2013.01)

(58) Field of Classification Search
USPC ......................................................... 348/148
See application file for complete search history.

(56) References Cited

U.S. PATENT DOCUMENTS 10,504,241 B2 12/2019 Singh
2018/0174327 A1 6/2018 Singh

FOREIGN PATENT DOCUMENTS

DE 102015011536 A1 3/2017
EP 3138736 B1 7/2018

OTHER PUBLICATIONS

DE_102015011536_AAPA_electronic_translation (Year: 2006).*
German Office Action dated Nov. 5, 2019 of German application No. DE 102019105659.4.

* cited by examiner

*Primary Examiner* — Mikhail Itskovich
(74) *Attorney, Agent, or Firm* — Jones Day (57) ABSTRACT

Embodiments of the present disclosure relate to a camera monitor system providing areas of importance to a driver, to a corresponding vehicle and to a method for operating such a camera monitor system comprising at least two separate cameras arranged to record camera views of the surrounding of the vehicle being different for each camera and at least one monitor with a monitor screen suitably arranged to provide the recorded camera views on the screen at least to the driver of the vehicle, wherein the provided camera views and/or an arrangement of the different recorded camera views on the monitor screen depend(s) on a status of the vehicle, wherein a control unit is adapted to observe the status of the vehicle and to alter the arrangement of the camera views provided on the screen in dependence on the observed status of the vehicle.

20 Claims, 4 Drawing Sheets

IMAGE PRESENTATION FOR VEHICLES WITH MULTIPLE CAMERAS

CROSS-REFERENCE TO RELATED APPLICATION

This application claims priority to German patent application DE 10 2019 105 659.4, filed on Mar. 6, 2019, the entirety of which is incorporated herein by reference.

TECHNICAL FIELD

The technology described herein relates to a camera monitor system providing areas of importance to a driver, to a vehicle comprising such camera monitor system and to a method for operating such a camera monitor system

BACKGROUND

Motor vehicles are usually equipped with exterior mirrors on both sides in the driver's field of view, which detect the surrounding of the motor vehicle at least in a rear view direction. For some types of motor vehicles, mirror systems may consist of two or more mirrors of different sizes and with different mirror curvatures to detect areas of importance of the surroundings of the vehicle. Mirror systems consisting of several mirrors have the disadvantage that they have to be adjusted carefully not to generate non-visible zones between the provided rear views of each mirror leading to an inadequately fulfilled mirror purpose. In addition, exterior mirrors with remotely controlled adjusting devices for position adjustment are complex, cost-intensive and large-volume components that project far from the vehicle. Furthermore, mirror systems consisting of several individual mirrors spaced apart may cause unwanted glare to the driver if the sun or other bright light sources are unfavorable to the vehicle.

Due to the above circumstances, mirror replacement systems are already generally known as camera monitor systems. Such a mirror replacement system comprises at least one camera which captures and records the surrounding of the vehicle, a control unit to which image data from the camera are fed for processing, and at least one monitor as a screen in the field of vision of a driver which is connected to the control unit to display a monitor image of the current camera image captured by the camera. EP 3 138 736 A1 discloses such a camera monitor system, where the monitor screen displays a static camera view, which is overlaid by additional information also displayed on the monitor screen by the control unit. Depending on the amount and content of information such information may help the driver while driving and can thus contribute to safety and/or relieve the driver of his driving tasks. However, in case of rear view mirrors being replaced by camera monitor systems, information displayed on the monitor screen may reduce the rear view area being visible to the driver or distracts the driver's attention from the rear-view mirror image.

DE 10 2015 011 536 A1 describes a mirror replacement system as a camera monitor system (KMS) of a motor vehicle, in particular a commercial vehicle, having at least one camera which captures and records an environment of the motor vehicle in a camera image in real time, having at least one control device which is supplied with image data from the at least one camera for processing, and having at least one monitor as a screen in the field of view of a driver, which monitor is connected to the at least one control device for the purpose of representing a monitor image of the current camera image captured by the at least one camera. The control device is used to display information representations in the monitor image, which information representations are obtained by evaluating a vehicle sensor system and/or are produced by processing information from the camera image and/or are generated by evaluating data wirelessly transmitted by other vehicles or stationary objects, and the displayed information representation is respectively inserted into an image representation in a perspectively correct manner as so-called "augmented reality" in the monitor image. Lettering shown in an inverted manner and/or traffic signs shown in an inverted manner is/are recognized by means of character recognition and/or traffic sign recognition in the representation of the monitor image which is similar to a rear-view mirror and is/are reflected by means of an algorithm and is/are represented in a true-sided manner.

A camera calibration system for cameras of a vehicle according to U.S. Pat. No. 10,504,241 includes a plurality of cameras disposed at a vehicle and having respective fields of view exterior of the vehicle, with the fields of view of two of the cameras overlapping. While the vehicle is moving, an image processor of a control processes image data captured by the two cameras to determine and track matching features in an overlapping region of the fields of view of the two cameras. The control, responsive to image processing of image data captured by the two cameras, determines motion of matching features and minimizes a cost function of the error in the matching of the features. The camera calibration system uses the determined minimized cost function to refine calibration results of the two cameras using a feedback loop.

It would be desirable to display all necessary information to the driver in order to provide a more complete view to the areas of importance for the driver of a motor vehicle in order to support the driver for safety driving.

SUMMARY

Embodiments of the technology described in the present disclosure include a camera monitor system for motor vehicles providing areas of importance to a driver comprising at least two separate cameras arranged to record camera views of the surrounding of the vehicle being different for each camera and at least one monitor with a monitor screen suitably arranged to provide the recorded camera views on the screen at least to the driver of the vehicle, wherein the provided camera views and/or an arrangement of the different recorded camera views on the monitor screen depend(s) on the status of the vehicle, wherein a control unit is adapted to observe the status of the vehicle and to alter the arrangement of the camera views provided on the screen in dependence on the observed status of the vehicle.

In embodiments, the camera monitor system denotes a system, where the cameras are connected to the monitor(s) via data connections via a control unit further processing the images from the vehicle surrounding recorded by the cameras. The cameras might be any suitable cameras providing digital images from the surroundings. The cameras can be equipped with different lenses to provide a wider angle view or a small angle view or apply a zoom to provide an adaptable viewing angle. In certain embodiment, the control unit comprises a processor, where image processing software is installed to process the received images representing different views from the surrounding of the vehicle depending on the camera location, its alignment relative to the driving direction and the used lens and zoom factor of the camera. The monitor can be any suitable monitor, where its screen is adapted to display different views, here images received from different cameras and processed by the control unit, beside each other. The control unit and the correspondingly controlled monitor and monitor screen may arrange and re-arrange views to be displayed on demand in response of a corresponding signal from the control unit to display certain views in certain areas on the monitor screen. Therefore, the monitor can also be equipped with an image processing unit to receive and adapt the signals received from the control unit. In embodiments, the observation of the status of the vehicle may result in different camera views provided by the monitor screen in case of the status of the vehicle has changed, e.g. from a standing or parking vehicle to a vehicle driving backwards or forwards setting the blinker. The provided arrangement of views may be adapted to enlarge the visible areas being important for the driver based on the current status of the vehicle. This will improve the driver safety. In embodiments, the driver does not have to select required views because the camera monitor system provides the required views automatically based on the observed status of the vehicle.

Embodiments of the present disclosure support the driver of a motor vehicle to drive safely by making areas of importance visible for the driver of a motor vehicle and displaying all necessary information to the driver in a simple and easily understandable manner.

In an embodiment, the control unit is at least connected to a control board or a bus system of the vehicle to receive at least one driving parameter of the group of vehicle velocity, steering angle, engine on/off, blinker settings on/off right/left, traffic situation around the vehicle, driving direction forwards/backwards, glare, recognized traffic signals and lane marks, and ultrasound warnings.

In an embodiment, the status of the vehicle comprises at least two elements or at least two combinations thereof of a group of elements comprising vehicle on, vehicle off, driving forwards mode, driving backwards mode, parking mode, non-driving mode, drive around a right-hand bend, drive around a left-hand bend, blinker on to right side, blinker on to left side, blinker off, drive in light, in particular bright, environment and drive in dark environment. Therefore, the status of the vehicle relates to significant changes of the driving situation which requires different views to be provided to the driver in order to show all necessary events to the driver before entering into critical driving situations.

In another embodiment, the camera monitor system comprises monitors on both sides of the vehicle. With monitors on both sides of the vehicle the driver receives all required information about the surrounding of the vehicle on both sides further improving the driver safety.

In another embodiment, the cameras comprise at least one rear view camera and at least one side view camera, and at least one front view camera enabling the camera monitor system to offer a 360° view around the vehicle to the driver depending on the status of the vehicle.

In another embodiment, the control unit is adapted to overlay the displayed camera views by additional information in case of particular status of the vehicle. Auxiliary lines on top of the displayed view provide further guidance to the driver and therefore further improves the driving safety.

In another embodiment, the control unit will provide distance lines and/or steering lines as information in case of driving the vehicle below a predetermined velocity threshold. Auxiliary lines on top of the displayed view provide further guidance to the driver and therefore further improves the driving safety, especially in case of driving backwards, which is commonly done at low velocity. In a preferred embodiment the predetermined velocity threshold is 20 km/h in forward or backward driving direction.

In another embodiment, in case of an activated blinker the control unit provides an aspherical wider camera view to the side to which the blinker is activated. A wider view to the side where the vehicle turns to is important to avoid accidents during a turning process. In one embodiment, the aspherical wider view is only provided in case of vehicle velocities below 30 km/h, preferably below 20 km/h. At higher velocities, the driver preferably should put his main attention mainly to the front direction.

In another embodiment, the camera monitor system comprises an insert unit adapted to provide certain camera views to the screen selectable by the driver. Here the driver can add further views to the already displayed views on demand.

In certain embodiments, the monitor screen shows the different camera views in adjacent sub-windows on the screen. Adjacent sub-windows may provide a view to a scenery assembled by different partial views displayed side-by-side adding up to a wider view of the whole scenery. In one embodiment, the sub-windows are displayed seamless to each other delivering a whole scenery without distinct frames around each partial view displayed in each sub-window. In other embodiments the sub-windows may be separated by borderlines.

In embodiment, the monitor screen alters from one to another of the following arrangement of the camera views in dependence of the status of the vehicle, where (a) at least a first sub-window provides a first view as a small angle side rear view recorded by a side camera and a second sub-window providing a second view as a wide angle side rear view, preferably an aspherical wider view, recorded by another side camera arranged side-by-side on the monitor screen in case of the vehicle being on and/or driving forwards as a first arrangement;

(b) in addition to the first arrangement a third sub-window providing a third view as a rear view from a rear camera is arranged side-by-side on the monitor screen in case of the vehicle driving forwards with activated blinker as a second arrangement, where the third view comprises distance lines to vehicles in the back as overlay in the third view;

(c) at least the first sub-window providing the first view and a fourth sub-window providing a fourth view as a wide angle rear view, preferably an aspherical wider view, recorded by another rear camera is arranged side-by-side on the monitor screen in case of the vehicle driving backwards as a third arrangement, where the fourth view comprises steering lines for the vehicle as overlay in the fourth view; or (d) the screen is switched off in case of the vehicle being off as a fourth arrangement.

These arrangements are improved arrangements for the particular driving situations establishing different vehicle status. The system may also provide additional functions such as showing warnings like triangles or ultrasound data in case of detected lines, lane departure, fee space, open doors, heater on, view blocked, camera malfunction, etc.

In another embodiment, in the first and/or second arrangement the monitor screen further comprises at least a fifth sub-window providing at least a fifth view as a small or wide angle front or side front view recorded by a side camera and/or front camera side-by-side on the monitor screen.

In another embodiment in the third arrangement the monitor screen further comprises the second sub-window providing the second rear view side-by-side on the monitor screen.

In an embodiment, a virtual vehicle model is incorporated into the displayed views as a further sub-window to indicate the vehicle boundaries to the driver. The virtual vehicle model gives additional orientation to the driver, how the displayed views relate to the vehicle boundaries. The virtual vehicle model need not depict the complete vehicle body, rather parts thereof are sufficient to assist the driver in understanding the relationship of the different camera views within the different sub-windows in relation to vehicle. Thus, it is sufficient to depict one vehicle boundary e.g. the boundary of the door next to the driver in order to indicate the vehicle boundaries to the driver.

In another embodiment at least one of the views is displayed as two-dimensional top view, preferably the views with overlaid information. In case of backwards driving a top view may provide a simplified view being easier to understand. This helps the driver to analyze the current situation fast and reliable.

In another embodiment, the sub-windows comprise a shape suitable resulting in an arrangement providing a contiguous picture of an environment of the vehicle at least on one side of the vehicle.

In another embodiment, the arrangements are provided on the monitor screen in a mirror-inverted arrangement for the respective monitors on both sides of the vehicle.

Embodiments of the disclosure further relate to a motor vehicle comprising a camera monitor system. The camera monitor system may comprise one monitor on the driver side or more monitors on each side or location, where such a monitor support the driver. The term "vehicle" denotes to all kind of vehicles comprising cars, ships, trains, airplanes and other motor driving vehicles.

Embodiments of the disclosure further relate to a method to operate a camera monitor system for motor vehicles providing areas of importance to a driver comprising steps of
  recording camera views of the surrounding of the vehicle with at least two separate cameras, where the camera views being different for each camera;
  providing the recorded camera views on a monitor screen of at least one monitor at least to the driver of the vehicle, where the provided camera views and/or an arrangement of the different recorded camera views on the monitor screen depends on a status of the vehicle;
  observing the status of the vehicle by a suitably adapted control unit; and
  altering the arrangement of the camera views provided on the screen by the control unit in dependence on the observed status of the vehicle.

In an embodiment, the method further comprises showing the different camera views in adjacent sub-windows on the monitor screen. In one embodiment, the sub-windows are displayed seamless to each other.

In another embodiment, the method further comprises additional steps of
  providing a first view in a first sub-window as a small angle side rear view recorded by a side camera and providing a second view in a second sub-window as a wide angle side rear view, preferably an aspherical wider view, recorded by another side camera arranged side-by-side on the monitor screen in case of the vehicle being on and/or driving forwards as a first arrangement;
  in addition to the first arrangement providing a third view in a third sub-window as a rear view from a rear camera arranged side-by-side on the monitor screen in case of the vehicle driving forwards with activated blinker as a second arrangement, where the third view comprises distance lines to vehicles in the back as overlay in the third view;
  at least providing the first view in the first sub-window and providing a fourth view in a fourth sub-window as a wide angle rear view, preferably an aspherical wider view, recorded by another rear camera arranged side-by-side on the monitor screen in case of the vehicle driving backwards as a third arrangement, where the fourth view comprises steering lines for the vehicle as overlay in the fourth view; or
  switching off the screen in case of the vehicle being off as a fourth arrangement.

The above listed embodiments can be used individually or in any combination to provide the device and the process in accordance with the technology described in the present disclosure.

BRIEF DESCRIPTION OF THE FIGURES

These and other aspects of the present disclosure are shown in detail in the illustrations as follows.

DETAILED DESCRIPTION

Figure 1:
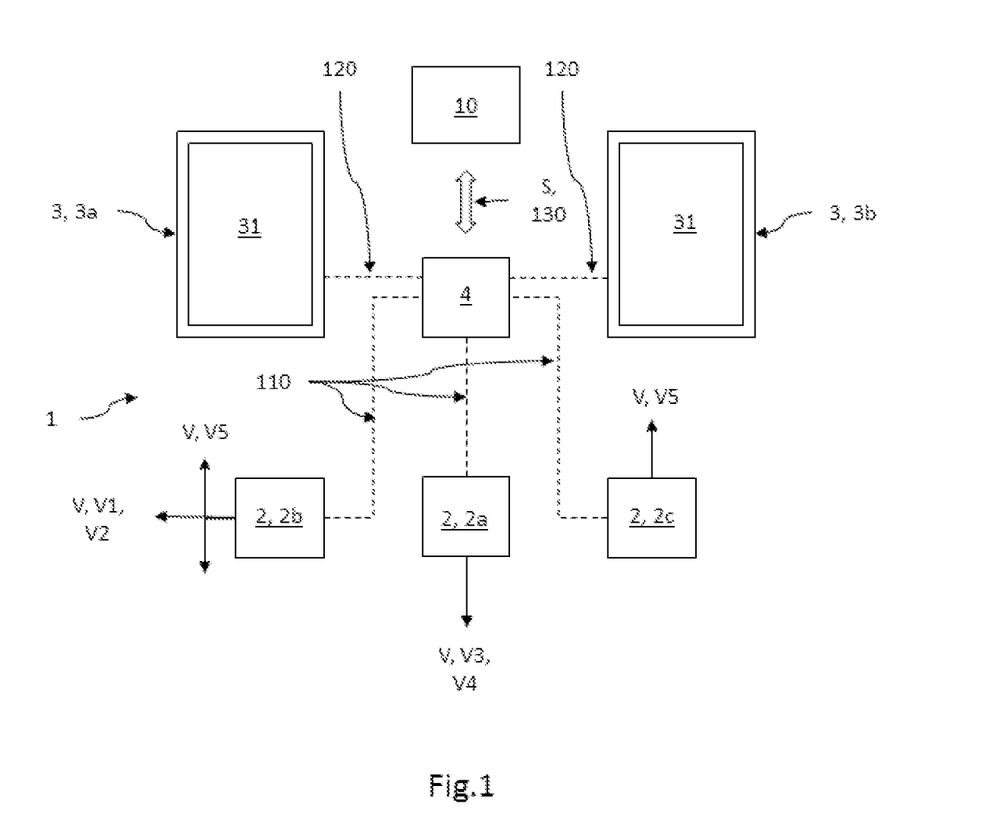
FIG. 1: a schematic view of an embodiment of a camera monitor system.

FIG. 1 shows a schematic view of an embodiment of a camera monitor system 1 for motor vehicles 10 providing areas of importance to a driver 20. The camera monitor system 1 comprises three separate cameras 2, 2a, 2b, 2c arranged to record 110 camera views V of the surrounding of the vehicle 10 being different for each camera 2, 2a, 2b, 2c and two monitors 3, 3a, 3b with a monitor screen 31 suitably arranged to provide 120 the recorded camera views V on the screen 31 at least to the driver 20 (not shown here) of the vehicle 10. The provided camera views V and/or arrangements M1, M2, M3, M4 (see FIG. 5) of the different recorded camera views V on the monitor screen 31 depend(s) on a status S of the vehicle 10, wherein a control unit 4 is adapted to observe 130 the status S of the vehicle 10 and to alter the arrangement M1, M2, M3, M4 of the camera views V provided on the screen 31 in dependence on the observed status S of the vehicle 10. The status S of the vehicle 10 comprises at least two elements or at least two combinations thereof of a group of elements comprising vehicle on VO, vehicle off VF, driving forwards mode, driving backwards mode, parking mode, non-driving mode, drive around a right-hand bend, drive around a left-hand bend, blinker on BO to right side, blinker on BO to left side, blinker off BF, drive in light environment and drive in dark environment. Here the camera monitor system 1 comprises two monitors 3a, 3b on both sides of the vehicle 10. The three cameras 2 comprise a rear view camera 2a, a side view camera 2b and a front view camera 2c, where the side view camera 2b is adapted to provide a side view, a front view from the side of the vehicle and a rear view from the side of the vehicle.

Figure 2:
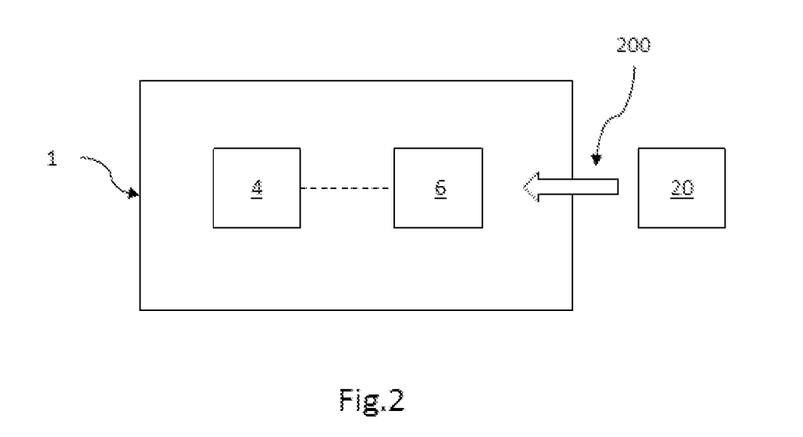
FIG. 2: a schematic view of another embodiment of a camera monitor system.

FIG. 2 shows a schematic view of another embodiment of the camera monitor system 1 comprising an insert unit 6 connected to the control unit 4 adapted to provide certain camera views V to the screen selectable 200 by the driver 20 on demand. The insert unit might be a keyboard, a touch screen or an arrangements of control switches to select the views on demand.

Figure 3:
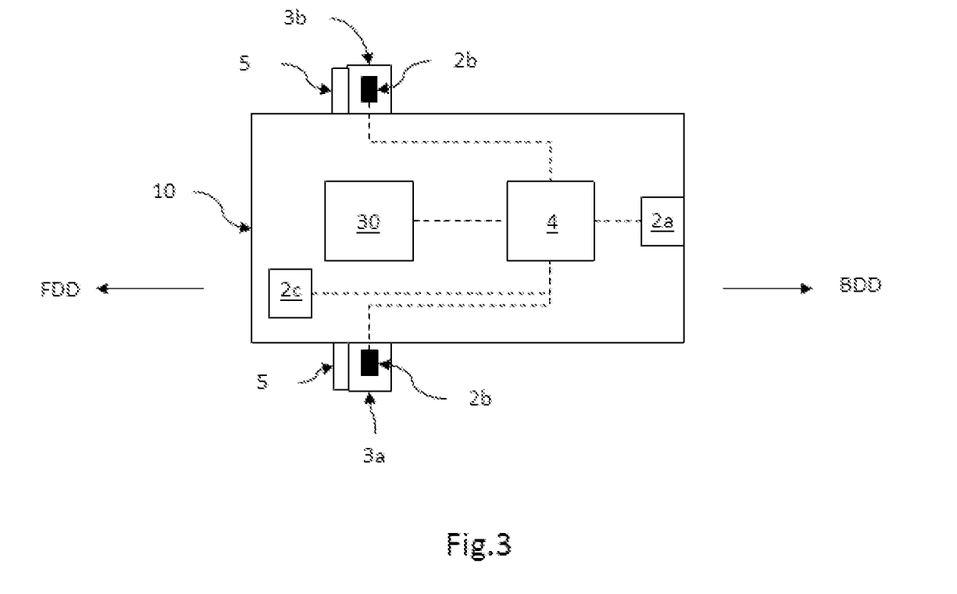
FIG. 3: a schematic view of a vehicle.

FIG. 3 shows a schematic view of the vehicle 10 comprising a camera monitor system 1. The control unit 4 is connected to a control board or a bus system 30 of the vehicle 10 to receive at least one driving parameter of the group of vehicle velocity VV, steering angle, engine on/off, blinker 5 settings on/off right/left, traffic situation around the vehicle 10, driving direction forwards/backwards, glare, recognized traffic signals and lane marks, and ultrasound warnings. Here the camera monitor system 1 comprises monitors 3a, 3b on both sides of the vehicle 10, the monitor 3a on the driver side and the monitor 3b on the passenger side. The vehicle further comprises blinker 5 on both sides, where in case of an activated blinker 5 the control unit 4 provides an aspherical wider camera view V2, V4 to the side to which the blinker 5 is activated. The information about an activated blinker 5 is received from the control board or a bus system 30. The aspherical wider view is only provided in case of vehicle velocities below 30 km/h, preferably below 20 km/h. The velocity information is also received from the control board or a bus system 30.

Figure 4:
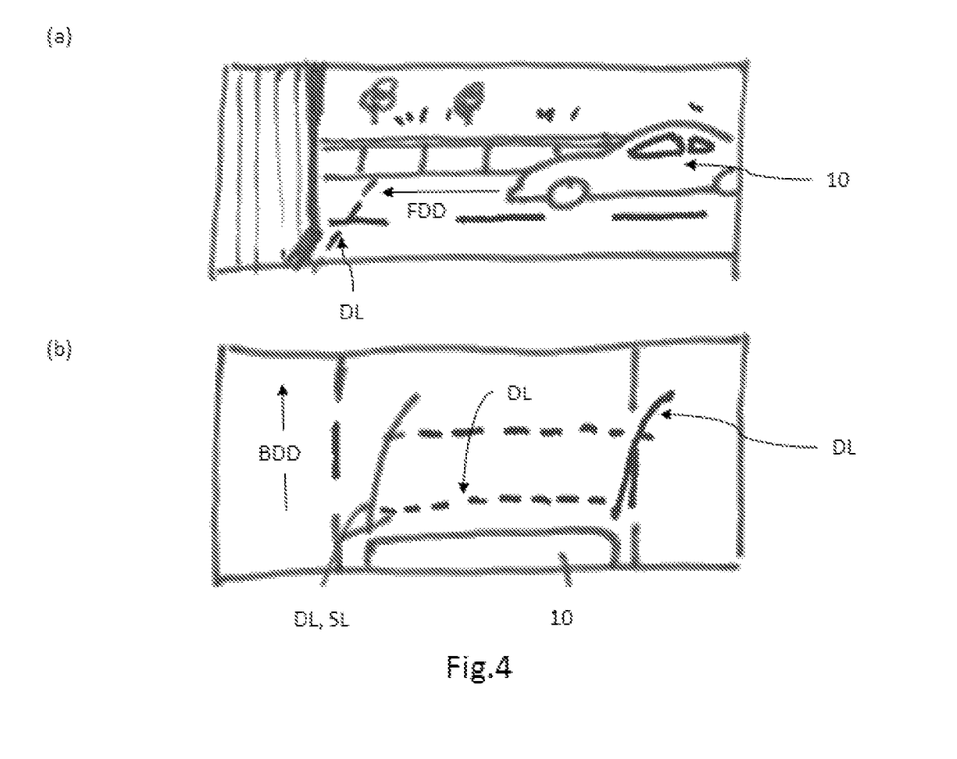
FIG. 4: an embodiment of views with additional information displayed as overlay.

FIG. 4 shows an embodiment of views with additional information displayed as overlay. Here the control unit 4 is adapted to overlay the displayed camera views V by additional information in case of particular status S of the vehicle 10. In FIG. 4a the control unit 4 will provide distance lines as information in case of driving the vehicle 10 below a predetermined velocity threshold. In FIG. 4b the control unit 4 will provide steering lines as information in case of driving the vehicle 10 below a predetermined velocity threshold. The predetermined velocity threshold is 20 km/h in forward or backward driving direction FDD, BDD.

Figure 5:
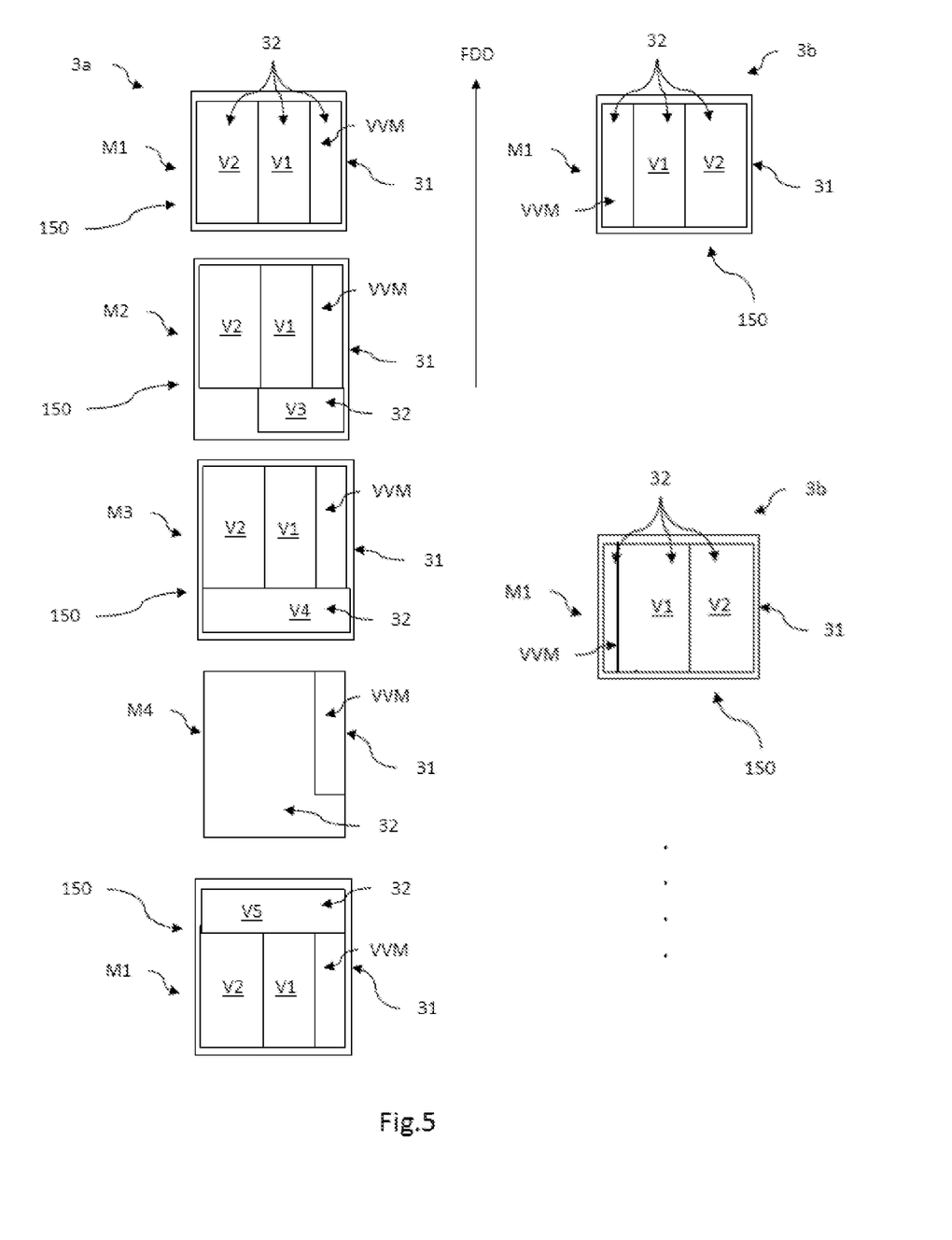
FIG. 5: several embodiments of different arrangements of displayed views arranged in different sub-windows of a monitor screen.

FIG. 5 shows several embodiments of different arrangement of displayed views arranged in different sub-windows of the monitor screen. Here, the monitor screen 31 shows the different camera views V in adjacent sub-windows 32 on the screen 31, where the sub-windows are displayed seamless to each other. The monitor screen 31 alters from one to another of the following arrangement M1, M2, M3, M4 of the camera views V in dependence of the status S of the vehicle 10, where a first sub-window 32 provides a first view V1 as a small angle side rear view recorded by a side camera 2b and a second sub-window 32 providing a second view V2 as a wide angle side rear view, preferably an aspherical wider view, recorded by another side camera 2b arranged side-by-side on the monitor screen 31 in case of the vehicle being on and/or driving forwards as a first arrangement M1; in addition to the first arrangement a third sub-window 32 providing a third view V3 as a rear view from a rear camera 2a is arranged side-by-side on the monitor screen 31 in case of the vehicle 10 driving forwards with activated blinker 5 as a second arrangement M2, where the third view V3 comprises distance lines to vehicles in the back as overlay in the third view V3; and the first sub-window 32 providing the first view V1 and a fourth sub-window 32 providing a fourth view V4 as a wide angle rear view, preferably an aspherical wider view, recorded by another rear camera 2a is arranged side-by-side on the monitor screen 31 in case of the vehicle driving backwards as a third arrangement M3, where the fourth view comprises steering lines for the vehicle 10 as overlay in the fourth view V4; and the screen 31 is switched off in case of the vehicle being off as a fourth arrangement M4. In the first and/or second arrangement M1, M2 the monitor screen 31 may further comprise at least a fifth sub-window 32 providing at least a fifth view V5 as a small or wide angle front or side front view recorded by a side camera 2b and/or front camera 2c side-by-side on the monitor screen 31. In the third arrangement M3 the monitor screen 31 further comprises the second sub-window providing the second rear view V2 side-by-side on the monitor screen 31. Additionally, a virtual vehicle model VVM is incorporated into the displayed views V1-V5 as a further, sixth sub-window 32 to indicate the vehicle boundaries to the driver 20.

The virtual vehicle model VVM is incorporated into the displayed views as the further, sixth sub-window to indicate the vehicle boundaries to the driver and, thus, provide additional orientation to the driver, how the displayed views relate to the vehicle boundaries. The virtual vehicle model VVM must not depict the complete vehicle body, rather parts thereof are sufficient to assist the driver in understanding the relationship of the different camera views within the different sub-windows in relation to vehicle. Thus, it is sufficient to depict one vehicle boundary e.g. the boundary of the door next to the driver in order to indicate the vehicle boundaries to the driver. Accordingly, the further sixth sub-window can be narrow, in particular narrower than the other sub-windows, with even one clearly discernible, highlighted line being sufficient.

In FIG. 5 at least one of the views V1-V5 are displayed as two-dimensional top view, preferably the views V3, V4 with overlaid information, see FIG. 4. The sub-windows 32 comprise a shape suitable resulting in an arrangement M1, M2, M3, M4 providing a contiguous picture of an environment of the vehicle at least on one side of the vehicle 10. The shown rectangular shapes of the sub-windows are only a particular example. The shape of the sub-windows according to the present invention is not limited to rectangular shapes. The sub-windows may have any suitable shape, e.g. triangular, trapezoidal or diamond-shaped. The arrangements M1, M2, M3, M4 are provided on the monitor screen 31 in a mirror-inverted arrangement for the respective monitors 3a (left side) and 3b (right side, one example in case of arrangement M1) on both sides of the vehicle 10.

Figure 6:
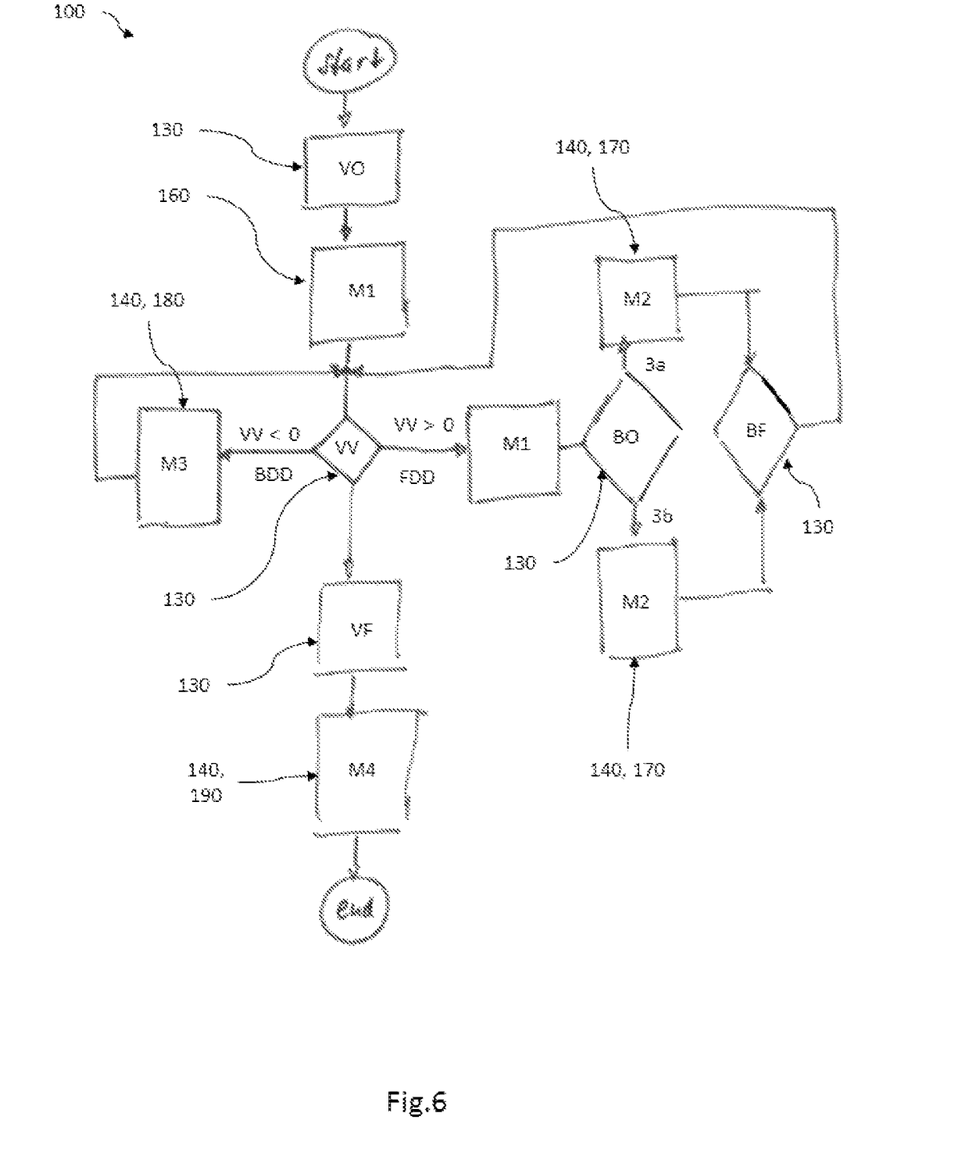
FIG. 6: an embodiment of a method to operate a camera monitor system for motor vehicles providing areas of importance to a driver.

FIG. 6 shows an embodiment of the method 100 to operate a camera monitor system 1 for motor vehicles 10 providing areas of importance to a driver 20, where beside the steps of recording 110 camera views V of the surrounding of the vehicle 10 with at least two separate cameras 2, 2a, 2b, 2c, where the camera views being different for each camera 2, 2a, 2b, 2c; and providing 120 the recorded camera views V on a monitor screen 31 of at least one monitor 3, 3a, 3b at least to the driver 20 of the vehicle 10, where the provided camera views V and/or an arrangement M1, M2, M3, M4 of the different recorded camera views V on the monitor screen 31 depends on a status S of the vehicle 10 as shown in FIG. 1. The method further comprises the steps of observing 130 the status S of the vehicle 10 by a suitably adapted control unit 4 and altering 140 the arrangement M1, M2, M3, M4 of the camera views V provided on the screen 31 by the control unit 4 in dependence on the observed status S of the vehicle 10. Here different camera views V might be shown 150 in adjacent sub-windows 32 on the monitor screen 31, see FIG. 5. Preferably the sub-windows 32 are displayed seamless to each other. The method further comprises the steps of providing 160 a first view V1 in a first sub-window 32 as a small angle side rear view recorded by a side camera 2b and providing a second view V2 in a second sub-window 32 as a wide angle side rear view, preferably an aspherical wider view, recorded by another side camera 2b arranged side-by-side on the monitor screen 31 in case of the vehicle being on and/or driving forwards as a first arrangement M1; in addition to the first arrangement providing 170 a third view V3 in a third sub-window 32 as a rear view from a rear camera 2a arranged side-by-side on the monitor screen 31 in case of the vehicle 10 driving forwards with activated blinker 5 as a second arrangement M2, where the third view V3 comprises distance lines to vehicles in the back as overlay in the third view V3; at least providing 180 the first view V1 in the first sub-window 32 and providing a fourth view V4 in a fourth sub-window 32 as a wide angle rear view, preferably an aspherical wider view, recorded by another rear camera 2a arranged side-by-side on the monitor screen 31 in case of the vehicle driving backwards as a third arrangement M3, where the fourth view comprises steering lines for the vehicle 10 as overlay in the fourth view V4; or switching off 190 the screen 31 in case of the vehicle being off as a fourth arrangement M4.

The embodiments shown here are only examples of the present invention and must therefore not be understood as restrictive. Alternative embodiments considered by the skilled person are equally covered by the scope of protection of the present invention.

LIST OF REFERENCE NUMERALS 1 camera-monitor system for vehicles according to the present invention
2 different cameras
2a rear view camera
2b side view camera
2c front view camera
3 monitor
3a, 3b monitors on each side of the vehicle
4 control unit
5 blinker
6 insert unit
10 vehicle according to the present invention
20 driver of the vehicle
30 control board or bus system of the vehicle
31 monitor screen
32 sub-windows on the monitor screen
100 Method to operate a camera monitor system according to the present invention
110 recording camera views of the surrounding of the vehicle
120 providing the recorded camera views on a monitor screen of at least one monitor at least to a driver
130 observing the status of the vehicle by a suitably adapted control unit
140 altering the arrangement of the camera views in dependence on the observed status of the vehicle
150 showing the different camera views in adjacent sub-windows on the monitor screen
160 providing a first view and a second rear view as a first arrangement
170 providing a third view in addition to the first arrangement as a second arrangement
180 providing the first view and a fourth view as a third arrangement
190 switching off the screen as a fourth arrangement
200 selecting certain camera views by the driver via an insert unit
BDD backward driving direction
BF blinker off
BO blinker on
FDD forward driving direction
M1 first arrangement of the camera views on the monitor screen
M2 second arrangement of the camera views on the monitor screen
M3 third arrangement of the camera views on the monitor screen
M4 fourth arrangement of the camera views on the monitor screen
S status of the vehicle
V different camera views
V1 first camera view of the surrounding of the vehicle
V2 second camera view of the surrounding of the vehicle
V3 third camera view of the surrounding of the vehicle
V4 fourth camera view of the surrounding of the vehicle
V5 fifth camera view of the surrounding of the vehicle
VF vehicle off
VO vehicle on
VV vehicle velocity
VVM vehicle virtual model

What is claimed:

1. A camera monitor system for motor vehicles providing areas of importance to a driver, the camera monitoring system comprising:
at least two separate cameras which record different camera views of the surrounding of the vehicle; and
at least one monitor comprising a monitor screen which provides the recorded camera views on the screen at least to the driver of the vehicle,
wherein the provided camera views or an arrangement of the different recorded camera views on the monitor screen are provided in response to a status of the vehicle,
wherein a control unit observes the status of the vehicle and alters the arrangement of the camera views provided on the screen in response to the observed status of the vehicle,
wherein the monitor screen shows the different camera views in adjacent sub-windows on the screen,
wherein a first display arrangement includes at least a first sub-window providing a first view as a small angle side rear view recorded by a side camera and a second sub-window providing a second view as a wide angle side rear view recorded by another side camera which are arranged side-by-side on the monitor screen, and the first display arrangement is displayed in response to the status of the vehicle being vehicle driving forwards;
wherein a second display arrangement includes the first sub-window, the second sub-window, and a third sub-window providing a third view as a rear view from a rear camera which is arranged side-by-side on the monitor screen, wherein the second display arrangement comprises distance lines to vehicles behind the vehicle based on a determination that the vehicle is traveling below a first predetermined velocity threshold, the first predetermined velocity threshold based on a determination that the vehicle is traveling below a maximum velocity associated with the vehicle performing a turn maneuver, and the second display arrangement is displayed in response to the status of the vehicle being vehicle driving forwards with activated blinker, wherein a third display arrangement includes the first sub-window and a fourth sub-window providing a fourth view as a wide angle rear view recorded by another rear camera which is arranged side-by-side on the monitor screen, wherein the third display arrangement comprises steering lines for the vehicle as an overlay of the fourth view based on a determination that the vehicle is traveling below a second predetermined velocity threshold, the second predetermined velocity threshold based on a determination that the vehicle is traveling below a maximum velocity associated with the vehicle driving backwards, and the third display arrangement is displayed in response to the status of the vehicle being vehicle driving backwards, wherein a fourth display arrangement includes the screen being switched off in response to the status of the vehicle being vehicle turned off, wherein the monitor screen alters between the first display arrangement, the second display arrangement, the third display arrangement, or the fourth display arrangement in response to the status of the vehicle, the monitor screen being configured to identify the area of importance in the selected display arrangement based on the status of the vehicle and to enlarge the sub-window corresponding to the area of importance, wherein a virtual vehicle model is provided on the displayed views as a further sub-window to indicate the vehicle boundaries to the driver, and wherein at least one of the views is displayed as a top view.

2. The camera monitor system according to claim 1, wherein the control unit is at least connected to a control board or a bus system of the vehicle to receive at least one driving parameter of the group of vehicle velocity, steering angle, engine on/off, blinker settings on/off right/left, traffic situation around the vehicle, driving direction forwards/backwards, glare, recognized traffic signals and lane marks, and ultrasound warnings.

3. The camera monitor system according to claim 1, wherein the status of the vehicle comprises at least two elements or at least two combinations of a group of elements comprising vehicle on, vehicle off, driving forwards mode, driving backwards mode, parking mode, non-driving mode, drive around a right-hand bend, drive around a left-hand bend, blinker on to right side, blinker on to left side, blinker off, drive in light, in particular bright, environment and drive in dark environment.

4. The camera monitor system according to claim 1, wherein the camera monitor system comprises monitors on both sides of the vehicle.

5. The camera monitor system according to claim 1, wherein the cameras comprise at least one rear view camera and at least one side view camera, and at least one front view camera.

6. The camera monitor system according to claim 1, wherein the control unit is adapted to overlay the displayed camera views by additional information in case of particular status of the vehicle.

7. The camera monitor system according to claim 1, wherein the second predetermined velocity threshold is 20 km/h.

8. The camera monitor system according to claim 1, wherein in case of an activated blinker the control unit provides an aspherical wider camera view to the side to which the blinker is activated.

9. The camera monitor system according to claim 8, wherein the aspherical wider view is only provided in case of vehicle velocities below 30 km/h, preferably below 20 km/h.

10. The camera monitor system according to claim 1, wherein the camera monitor system comprises an insert unit adapted to provide certain camera views to the screen selectable by the driver.

11. The camera monitor system according to claim 1, wherein the sub-windows are displayed seamless to each other.

12. The camera monitor system according to claim 1, wherein in the first or second arrangement the monitor screen further comprises at least a fifth sub-window providing at least a fifth view as a small or wide angle front or side front view recorded by a side camera and/or front camera side-by-side on the monitor screen.

13. The camera monitor system according to claim 1, where in the third arrangement the monitor screen further comprises the second sub-window providing the second rear view side-by-side on the monitor screen.

14. The camera monitor system according to claim 1, wherein the top view is two-dimensional.

15. The camera monitor system according to claim 1, wherein
the sub-windows comprise a shape suitable resulting in an arrangement providing a contiguous picture of an environment of the vehicle at least on one side of the vehicle.

16. The camera monitor system according to claim 1, wherein
the arrangements are provided on the monitor screen in a mirror-inverted arrangement for the respective monitors on both sides of the vehicle.

17. A motor vehicle comprising a camera monitor system according to claim 1.

18. A method for operating a camera monitor system for motor vehicles providing areas of importance to a driver, comprising:
recording different camera views of the surrounding of the vehicle with at least two separate cameras;
providing the recorded camera views on a monitor screen of at least one monitor at least to the driver of the vehicle, where the provided camera views or an arrangement of the different recorded camera views on the monitor screen depends on a status of the vehicle;
observing the status of the vehicle by a suitably adapted control unit; and
altering the arrangement of the camera views provided on the screen by the control unit in response to the observed status of the vehicle,
wherein a first display arrangement includes at least a first sub-window providing a first view as a small angle side rear view recorded by a side camera and a second sub-window providing a second view as a wide angle side rear view recorded by another side camera which are arranged side-by-side on the monitor screen, and the first display arrangement is displayed in response to the status of the vehicle being vehicle driving forwards,
wherein a second display arrangement includes the first sub-window, the second sub-window, and a third sub-window providing a third view as a rear view from a rear camera which is arranged side-by-side on the monitor screen, wherein the second display arrangement comprises distance lines to vehicles behind the vehicle based on a determination that the vehicle is traveling below a first predetermined velocity threshold, the first predetermined velocity threshold based on a determination that the vehicle is traveling below a maximum velocity associated with the vehicle performing a turn maneuver, and the second display arrangement is displayed in response to the status of the vehicle being vehicle driving forwards with activated blinker, wherein a third display arrangement includes the first sub-window and a fourth sub-window providing a fourth view as a wide angle rear view recorded by another rear camera which is arranged side-by-side on the monitor screen, wherein the third display arrangement comprises steering lines for the vehicle as an overlay of the fourth view based on a determination that the vehicle is traveling below a second predetermined velocity threshold, the second predetermined velocity threshold based on a determination that the vehicle is traveling below a maximum velocity associated with the vehicle driving backwards, and the third display arrangement is displayed in response to the status of the vehicle being vehicle driving backwards, wherein a fourth display arrangement includes the screen being switched off in response to the status of the vehicle being turned off, wherein the altering of the arrangement of the camera views provided on the screen comprises altering between the first display arrangement, the second display arrangement, the third display arrangement, or the fourth display arrangement in response to the status of the vehicle, identifying the area of importance in the selected display arrangement based on the status of the vehicle and enlarging the sub-window corresponding to the area of importance, wherein a virtual vehicle model is provided on the displayed views as a further sub-window to indicate the vehicle boundaries to the driver, and wherein at least one of the views is displayed as a top view.

19. The method according to claim 18, further comprising:

showing the different camera views in adjacent sub-windows on the monitor screen.

20. The method according to claim 19, further comprising: providing a first view in a first sub-window as a small angle side rear view recorded by a side camera and providing a second view in a second sub-window as a wide angle side rear view, preferably an aspherical wider view, recorded by another side camera arranged side-by-side on the monitor screen in case of the vehicle being on and/or driving forwards as a first arrangement;

in addition to the first arrangement providing a third view in a third sub-window as a rear view from a rear camera arranged side-by-side on the monitor screen in case of the vehicle driving forwards with activated blinker as a second arrangement;

providing the first view in the first sub-window and providing a fourth view in a fourth sub-window as a wide angle rear view recorded by another rear camera arranged side-by-side on the monitor screen in case of the vehicle driving backwards as a third arrangement; and switching off the screen in case of the vehicle being off as a fourth arrangement.

* * * * *